United States Patent
Niiyama

(10) Patent No.: US 11,029,902 B2
(45) Date of Patent: Jun. 8, 2021

(54) PRINTING APPARATUS, PRINT CONTROL DEVICE, AND METHOD OF CONTROLLING PRINTING APPARATUS

(71) Applicant: SEIKO EPSON CORPORATION, Tokyo (JP)

(72) Inventor: Shinichiro Niiyama, Sapporo (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/576,883

(22) Filed: Sep. 20, 2019

(65) Prior Publication Data

US 2020/0097235 A1    Mar. 26, 2020

(30) Foreign Application Priority Data

Sep. 21, 2018   (JP) .............................. JP2018-177445

(51) Int. Cl.
*G06F 3/12* (2006.01)
(52) U.S. Cl.
CPC .......... *G06F 3/1256* (2013.01); *G06F 3/1208* (2013.01); *G06F 3/1242* (2013.01)
(58) Field of Classification Search
CPC ..... G06F 3/1256; G06F 3/1242; G06F 3/1208
See application file for complete search history.

(56) References Cited

U.S. PATENT DOCUMENTS

| | | | |
|---|---|---|---|
| 10,078,711 B2* | 9/2018 | Sakamoto | G06F 15/00 |
| 2003/0182402 A1* | 9/2003 | Goodman | H04N 1/0019 |
| | | | 709/220 |
| 2004/0066535 A1* | 4/2004 | Oyumi | H04N 1/00015 |
| | | | 358/1.15 |
| 2004/0150853 A1* | 8/2004 | Stodersching | G06F 3/1256 |
| | | | 358/1.13 |
| 2004/0208680 A1* | 10/2004 | Ryan, Jr. | G06K 15/10 |
| | | | 400/70 |
| 2007/0115491 A1* | 5/2007 | Kato | H04N 1/00 |
| | | | 358/1.13 |
| 2008/0079727 A1* | 4/2008 | Goldman | G06T 11/60 |
| | | | 345/441 |
| 2009/0262397 A1* | 10/2009 | Horn | G06F 3/1256 |
| | | | 358/1.18 |
| 2010/0157326 A1* | 6/2010 | Mori | G03G 15/6573 |
| | | | 358/1.5 |
| 2010/0302565 A1* | 12/2010 | Tanaka | G06F 3/1256 |
| | | | 358/1.9 |
| 2011/0029901 A1* | 2/2011 | Takata | G06T 11/60 |
| | | | 715/764 |
| 2011/0100238 A1* | 5/2011 | Caudle | B41J 13/12 |
| | | | 101/47 |

(Continued)

FOREIGN PATENT DOCUMENTS

JP    2015-049257    3/2015

*Primary Examiner* — Ted W Barnes
(74) *Attorney, Agent, or Firm* — Workman Nydegger

(57) ABSTRACT

A printer includes a printing mechanism, a display device, a print controller configured to control the printing mechanism to print an image on a print medium, and a display controller configured to make the display device display a preview image in which the image to be printed on the print medium and a processing position where processing is performed on the print medium after the printing are superimposed with each other, wherein the print controller makes the printing mechanism print the image and a processing position image representing the processing position.

10 Claims, 10 Drawing Sheets

(56) References Cited

U.S. PATENT DOCUMENTS

| | | | |
|---|---|---|---|
| 2011/0149315 A1* | 6/2011 | Yamazaki | H04N 1/0044 358/1.9 |
| 2011/0255099 A1* | 10/2011 | Harano | G06F 3/1256 358/1.5 |
| 2011/0286011 A1* | 11/2011 | Shoji | H04N 1/3935 358/1.1 |
| 2012/0026519 A1 | 2/2012 | Yoshida | |
| 2013/0195534 A1* | 8/2013 | Oohara | G03G 15/6576 399/406 |
| 2014/0078539 A1* | 3/2014 | Kakitsuba | G06F 3/1204 358/1.13 |
| 2015/0062602 A1* | 3/2015 | Ono | G06K 15/188 358/1.9 |
| 2015/0253710 A1* | 9/2015 | Tomita | G03G 15/0415 399/86 |
| 2015/0277307 A1* | 10/2015 | Goto | G03G 15/5058 399/49 |
| 2018/0173478 A1* | 6/2018 | Hayakawa | G06F 3/1252 |
| 2019/0317711 A1* | 10/2019 | Kaneda | G06F 3/1292 |
| 2019/0320088 A1* | 10/2019 | Hossepian | H04N 1/393 |
| 2020/0065430 A1* | 2/2020 | Sakamoto | G06F 30/00 |

* cited by examiner

FIG. 4

| BASIC JOB IMAGE DESIGNATION INFORMATION | BASIC JOB PRINTING CONDITION | PRINTING LENGTH | FIRST COMBINING JOB IMAGE DESIGNATION INFORMATION | FIRST COMBINING JOB ARRANGEMENT CONDITION | FIRST COMBINING JOB PRINTING CONDITION | PROCESSING PATTERN DESIGNATION INFORMATION | PROCESSING PATTERN ARRANGEMENT INFORMATION | MEDIUM DESIGNATION INFORMATION |
|---|---|---|---|---|---|---|---|---|
| 151 | 152 | 153 | 154 | 155 | 156 | 157 | 158 | 159 |

126

PRINTING APPARATUS, PRINT CONTROL DEVICE, AND METHOD OF CONTROLLING PRINTING APPARATUS

The present application is based on, and claims priority from JP Application Serial Number 2018-177445, filed Sep. 21, 2018, the disclosure of which is hereby incorporated by reference herein in its entirety.

BACKGROUND

1. Technical Field

The present disclosure relates to a printing apparatus, a print control device, and a method of controlling a printing apparatus.

2. Related Art

In the past, there has been known a printing apparatus displaying a preview of an image to be printed (see, e.g., JP-A-2015-049257 (Document 1)). The device described in Document 1 uses an image of a recording target medium as a background image, and displays the image to be printed so as to be superimposed on the background image.

The present disclosure shows the positional relationship between the image to be printed on the print medium and a position of processing performed on the print medium in an easy-to-understand manner.

SUMMARY

An aspect of the present disclosure is directed to a printing apparatus including a printing mechanism, a display, a print controller configured to control the printing mechanism to print an image on a print medium, and a display controller configured to make the display display a preview image in which the image to be printed on the print medium and a processing position where processing is performed on the print medium after the printing are superimposed with each other, wherein the print controller makes the printing mechanism print the image and a processing position image representing the processing position.

The printing apparatus described above may be configured such that the display controller performs a correction process configured to correct the processing position based on a shrinkage ratio of the print medium, and makes the display display the preview image including the processing position on which the correction process was performed.

The printing apparatus described above may be configured such that the printing apparatus further includes a data acquisition section configured to obtain data representing the processing position and the shrinkage ratio of the print medium, and the display controller corrects the data obtained by the data acquisition section based on the shrinkage ratio of the print medium obtained by the data acquisition section in the correction process.

The printing apparatus described above may be configured such that the printing apparatus further includes an input device configured to receive an input, and the data acquisition section obtains the shrinkage ratio of the print medium input by the input device.

In the printing apparatus described above, the print controller may selectively perform an operation of printing the image by the printing mechanism, and an operation of printing the image and the processing position image by the printing mechanism.

In the printing apparatus described above, the printing mechanism may include a print head with which the print medium is scanned, and the print controller may selectively perform same scan printing of printing the image and the processing position image in a same scan with the print head, and a separate scan printing of printing the image and the processing position image in respective scans different from each other of the print head.

The printing apparatus described above may be configured such that the print controller makes the printing mechanism print a first image, and a second image disposed within a range in which the first image is printed.

The printing apparatus described above may be configured such that the print controller changes a relative printing position of the second image to the first image, and makes the printing mechanism print the first image and the second image in accordance with the printing position changed.

The printing apparatus described above may be configured such that the printing apparatus further includes an input device configured to receive an input, the print controller changes the printing position of the second image based on the input received by the input device in a state in which a preview image including the first image, the second image, and the processing position is displayed, and the display controller updates display of the preview image in accordance with the position of the second image changed.

In the printing apparatus described above, the print controller may arrange a plurality of the second images in an area where the single first image is printed by the printing mechanism, and at least any of the second images may be different from other of the second images.

Another aspect of the present disclosure is directed to a print control device including a print controller configured to control a printing mechanism to print an image on a print medium, and a display controller configured to make a display display a preview image in which a state of the image printed on the print medium and a processing position where processing is performed on the print medium after the printing are superimposed with each other, wherein the print controller makes the printing mechanism print the image and a processing position image representing the processing position.

Another aspect of the present disclosure is directed to a method of controlling a printing apparatus including a printing mechanism configured to print an image on a print medium, and a display, the method including the steps of displaying, on the display, a preview image in which the image to be printed on the print medium and a processing position where processing is performed on the print medium after the printing are superimposed with each other, and printing, by the printing mechanism, the image and a processing position image representing the processing position.

BRIEF DESCRIPTION OF THE DRAWINGS

FIG. 4 is a schematic diagram showing a configuration example of job data.

DESCRIPTION OF EXEMPLARY EMBODIMENTS

Some embodiments of the present disclosure will hereinafter be described with reference to the accompanying drawings. It should be noted that although in the embodiments described below, a variety of limitations are provided as preferred specific examples of the present disclosure, the scope of the present disclosure is not limited to these embodiments unless a description to limit the present disclosure thereto is particularly presented in the following explanations.

1. First Embodiment 1-1. Configuration of Printer

Figure 1:
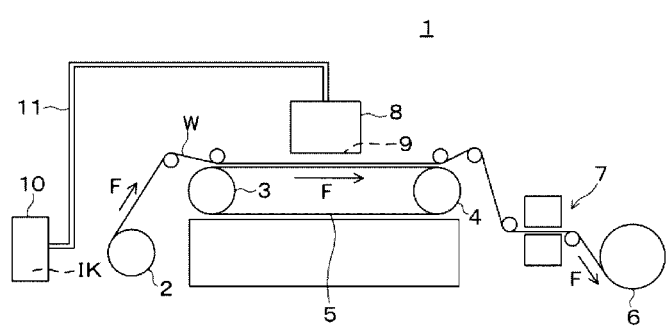
FIG. 1 is a schematic configuration diagram of a printer according to a first embodiment.

FIG. 1 is a perspective view showing a configuration of a printer 1 according to the first embodiment to which the present disclosure is applied.

The printer 1 is an inkjet type printing apparatus which is provided with a print head 9 for discharging ink IK, and discharges the ink IK on a print medium W to form an image.

The print medium W is fabric formed of, for example, natural fibers or synthetic fibers. The printer 1 is a printing machine for making the ink IK adhere to the print medium W as the fabric to thereby perform printing of the print medium W, and the print medium W can be called a printing target material. Further, as the print medium W, it is also possible to use exclusive paper for inkjet recording such as plain paper, high-quality paper, and gloss paper, besides the printing target material described above.

The printer 1 is provided with an unreeling device 2 for conveying the print medium W, conveying rollers 3, 4, a conveying belt 5, and a winding device 6. These sections constitute a conveying mechanism 21 described later. The printer 1 is provided with the print head 9, and an ink cartridge 10 for retaining the ink IK to be used in the print head 9.

The unreeling device 2 is a device for unreeling the print medium W which is elongated, and is wound into a roll, and is located most upstream in the conveying path of the print medium W.

The conveying rollers 3, 4 are a pair of rollers for driving the conveying belt 5 having an endless shape, wherein the conveying roller 3 is a drive roller, and the conveying roller 4 is a driven roller, for example. The conveying belt 5 is a glue belt the surface of which is provided with an adhesive layer having an adhesive property. The print medium W fed from the unreeling device 2 is adhesively fixed to the adhesive layer of the conveying belt 5, and is conveyed in the conveying direction F together with the conveying belt 5.

The conveying belt 5 conveys the print medium W in the conveying direction F, and supports the print medium W at a position opposed to the print head 9.

The print head 9 is mounted on a carriage 8, and reciprocates in a main scanning direction SC described later above the print medium W together with the carriage 8.

The print head 9 is coupled to the ink cartridge 10 with an ink supply channel 11. The printer 1 is capable of performing color printing using the ink IK of a plurality of colors, and the ink IK of four colors of, for example, black (K), cyan (C), magenta (M), and yellow (Y) is used. Further, it is also possible for the printer 1 to have a configuration of using the ink IK of a custom color such as a metallic color. The printer 1 is equipped with the ink cartridge 10 for each color of the ink IK, and the print head 9 is provided with nozzles corresponding respectively to the colors of the ink IK, and jets the ink IK from each of the nozzles.

It is possible for the print head 9 to have a configuration of jetting a soakage to the print medium W besides the ink IK. The soakage is a liquid for facilitating penetration of the ink IK having adhered to the obverse surface of the print medium W to the reverse surface. For example, in the printer 1, it is possible to adopt a configuration in which a cartridge retaining the soakage is coupled to the print head 9 separately from the ink cartridge 10. In this case, the print head 9 discharges the soakage toward the print medium W at the same time as the jet of the ink IK, or at a different timing from the jet of the ink IK.

The winding device 6 is located downstream in the conveying path of the print medium W, and winds the print medium W printed by the print head 9 around a winding reel.

Upstream the winding device 6, there is disposed a drying section 7. The drying section 7 is located between the printing position by the print head 9 and the winding device 6, and dries the ink IK having adhered to the print medium W. The drying section 7 has, for example, a chamber for housing the print medium W and a heater disposed inside the chamber, and dries the ink IK which is located on the print medium W in an undried state with the heat of the heater.

In the configuration shown in FIG. 1, it is also possible to dispose a tensioner, an intermediate conveying roller, or both of the tensioner and the intermediate conveying roller between the unreeling device 2 and the conveying roller 3, and between the conveying roller 4 and the winding device 6. For example, the tensioner provides the tension to the print medium W conveyed by pressing the print medium W with a roller. The intermediate conveying roller conveys the print medium W with, for example, a pair of rollers pinching the print medium W.

Figure 2:
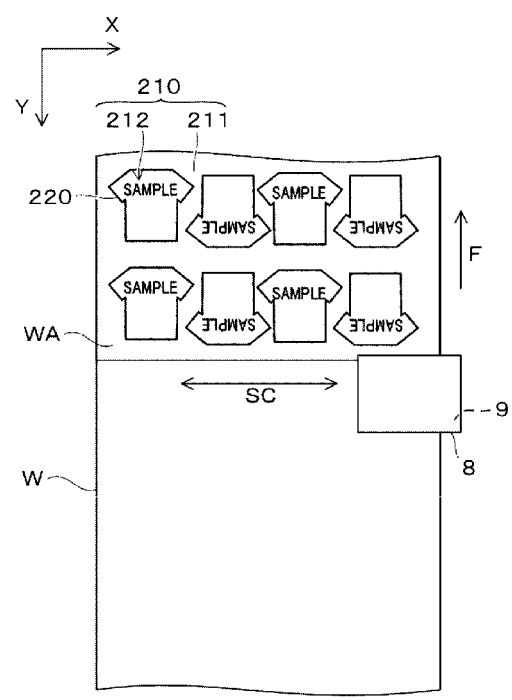
FIG. 2 is a schematic plan view showing a conveying direction of a print medium and a scanning direction of a carriage.

FIG. 2 is a schematic plan view showing the conveying direction of the print medium W and the scanning direction of the carriage 8. In FIG. 2, the area where the ink IK has adhered to the print medium W is represented by hatching as a printed area WA.

The carriage 8 is made to perform a reciprocating scan operation in a direction crossing the conveying direction F of the print medium W. In the present embodiment, the carriage 8 reciprocates in the main scanning direction SC crossing the conveying direction F. The length of the printed area WA in the conveying direction F is called a printing length.

Further, a control section 100 provided to the printer 1 expresses a position on the print medium W with an X coordinate and a Y coordinate. As shown in FIG. 2, the X coordinate and the Y coordinate are coordinates in a Cartesian coordinate system setting the main scanning direction SC in the print medium W as an X axis, and the conveying direction F as a Y axis.

In the present embodiment, the printer 1 prints a product image 210 and processing position images 220 on the print medium W. The product image 210 is an image set in advance as a job to be executed by the printer 1. In the example shown in FIG. 2, the product image 210 include a background image 211 to be printed as a pattern of a texture in the entire area of the print medium W, and logo images 212 to be arranged on the print medium W in a dispersed manner. In this example, the print medium W is a clothing material for manufacturing T-shirts, and the background image 211 and the logo images 212 as logos each located at a chest position of the T-shirt are to be printed on the print medium W. The processing position images 220 are images representing the positions of processing to be executed on the print medium W after printing. For example, when the print medium W is cut after printing to be cut out into a specific shape, the processing position images 220 represent cutting lines.

1-2. Configuration of Control System of Printer

Figure 3:
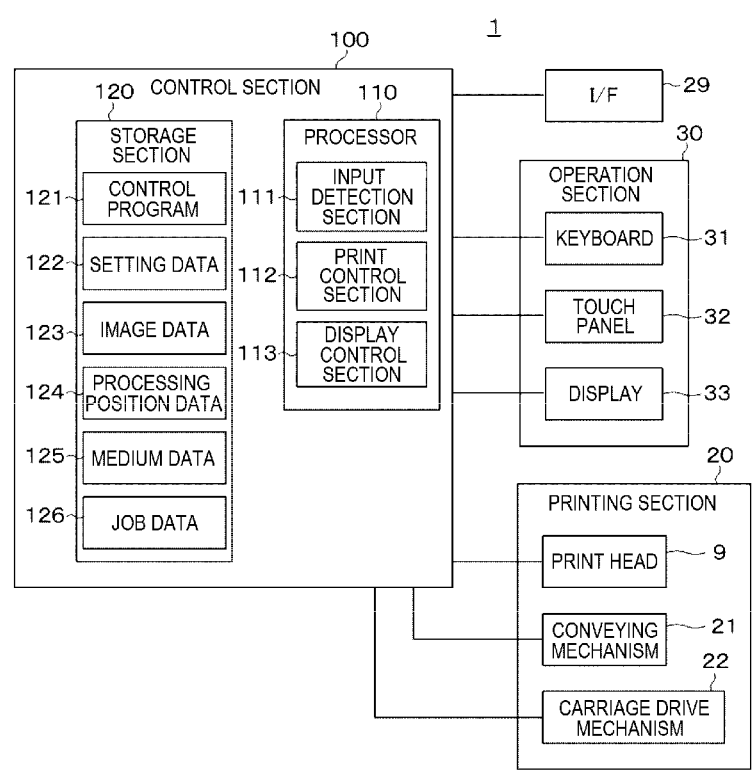
FIG. 3 is a block diagram of the printer.

FIG. 3 is a block diagram of the printer 1.

The printer 1 is provided with the control section 100 for controlling each section of the printer 1. The control section 100 is provided with a processor 110 for executing a program, and a storage section 120. The processor 110 is an arithmetic processing device formed of a CPU (central processing unit), a DSP (digital signal processor), a microcomputer, or the like. Further, the processor 110 can also be constituted by a plurality of pieces of hardware, or can also be formed of a single processor. Further, it is also possible for the processor 110 to be hardware programmed so as to realize the functions of the sections described later. In other words, it is possible for the processor 110 to have a configuration in which a control program 121 is implemented as a hardware circuit. In this case, for example, the processor 110 is formed of an ASIC (application specific integrated circuit) or an FPGA (field programmable gate array).

In the following description, there is described a configuration example for realizing the variety of functions of the control section 100 by the processor 110 executing the control program 121.

The control section 100 corresponds to a print control device.

The storage section 120 has a storage area for storing the program to be executed by the processor 110, and data to be processed by the processor 110. The storage section 120 stores the control program 121 to be executed by the processor 110, and setting data 122 including a variety of types of setting values related to the operation of the printer 1. The storage section 120 has a nonvolatile storage area for storing the program and the data in a nonvolatile manner. Further, it is also possible for the storage section 120 to be provided with a volatile storage area to form a print medium area for temporarily storing the program to be executed by the processor 110 and the data as the processing target.

To the control section 100, there is coupled a printing mechanism 20. The printing mechanism 20 includes the print head 9 and the conveying mechanism 21. The conveying mechanism 21 is a mechanism for conveying the print medium W, and includes the conveying rollers 3, 4 shown in FIG. 1, and a motor for driving these. Further, it is also possible for the conveying mechanism 21 to include the unreeling device 2 and the winding device 6. It is also possible for the conveying mechanism 21 to include the tensioner described above and the intermediate rollers described above.

Further, the printing mechanism 20 in the present embodiment includes a carriage drive mechanism 22. The carriage drive mechanism 22 is a mechanism for reciprocating the carriage 8 in the main scanning direction SC, and includes, for example, a motor as a drive source, a guide member for guiding the movement of the carriage 8, gears, links, and so on for transmitting the power of the motor to the carriage 8.

Further, it is also possible for a variety of sensors not shown to be coupled to the control section 100. For example, it is possible for a nozzle sensor for detecting a discharge failure of the nozzles provided to the print head 9, or a belt sensor for detecting a conveying failure in the conveying belt 5 to be coupled to the control section 100. It is also possible for the control section 100 to obtain and then determine detection values of the variety of sensors including these sensors, to thereby monitor the operation state of the printer 1.

To the control section 100, there is coupled an interface 29. The interface 29 is abbreviated as I/F in the drawing. The interface 29 is coupled to a device located outside the printer 1 with wire or wirelessly. The interface 29 is provided with, for example, a connector to which a cable is coupled, and an interface circuit for transmitting an electric signal via the cable. Further, it is also possible for the interface 29 to be a wireless communication module having an antenna and an RF circuit. The device located outside the printer 1 is, for example, a computer or a server device. When the control section 100 has received the image data from the external device by the interface 29, the control section 100 stores the image data thus received in the storage section 120. Further, when the control section 100 has received the job data for instructing printing from the external device by the interface 29, the control section 100 stores the job data thus received in the storage section 120.

The printer 1 is provided with an operation section 30. The operation section 30 is provided with a keyboard 31, a touch panel 32, and a display 33. It is also possible for the operation section 30 to have a configuration provided only with either one of the keyboard 31 and the touch panel 32. The display 33 corresponds to a display. Further, the operation section 30 is provided with the keyboard 31 and the touch panel 32 to thereby correspond to an input device.

The keyboard 31 has a plurality of keys to be operated by an operator, and outputs operation data representing the key having been operated to the control section 100. The display 33 has a display screen such as an LCD (liquid crystal display), and displays an image in accordance with the control by the control section 100. The touch panel 32 is disposed so as to be stacked on the display screen of the display 33, detects a contact operation to the display screen, and then outputs the operation data representing the contact position to the control section 100.

1-3. Configuration of Control Section

The control section 100 is provided with an input detection section 111, a print controller 112, and a display controller 113. As described above, by the processor 110 executing the control program 121, for example, these sections are realized due to the cooperation between software and hardware.

The storage section 120 stores the control program 121, the setting data 122, image data 123, processing position data 124, medium data 125, and job data 126. The control program 121 is a program to be executed by the processor 110, and the setting data 122 includes a setting value related to the execution of the control program 121.

The input detection section 111 detects the input operation of the operator based on the operation data input from the keyboard 31 and the touch panel 32, and then obtains the content thus input. The input detection section 111 analyzes the data received via the interface 29, and when the image data has been received, the input detection section 111 stores the image data in the storage section 120 as the image data 123. Further, when the data related to the print job has been received, the input detection section 111 stores the data related to the print job as the job data 126.

The image data 123 is the data of an image to be printed on the print medium W by the print head 9, and it is also possible for the image data 123 to be constituted as a database for storing the image data, and include the data of a plurality of images. As described later, it is possible for the printer 1 to print the plurality of images on the print medium W in a superimposed manner. It is also possible for the image data 123 to include the data of the plurality of images which can be printed in a superimposed manner.

The processing position data 124 includes data related to processing to be performed on the print medium W on which the printing has been performed. The processing on the print medium W is, for example, cutting, sewing, bonding to a material such as other fabric or paper. The processing position data 124 is data including, for example, a type of the processing and the processing positions in the print medium W. The processing on the print medium W is, for example, cutting, punching, buttonhole formation, embossing, sewing, stitching or bonding of another member, folding process for providing a crease, or painting. Another member is a button, a zipper, a surface fastener, an emblem, or the like. For example, the processing position data 124 includes information representing the fact that the type of the processing is the cutting process, and information representing the positions where the print medium W is cut.

The processing position data 124 can also be formed as the database for storing the data related to the processing, and in this case, the processing position data 124 can also include information related to a plurality of types of processing. For example, when there is a possibility that a plurality of cutting patterns different in shape and position are performed on the print medium W, the information related to the processing positions of the plurality of cutting patterns can also be included in the processing position data 124.

The medium data 125 is data related to the print medium W, and includes, for example, information related to characteristics of the print medium W. The medium data 125 can also be a database for storing the information related to the characteristics of a plurality of types of print medium W which can be printed by the printer 1 so as to correspond to the types of the print medium W. The characteristics of the print medium W include, for example, a shrinkage ratio. When the print medium W is the fabric as so-called woven cloth, and when the print medium W is a knitted material, the print medium W shrinks in some cases by performing processing of washing or prewashing of the print medium W after performing printing with the printer 1.

The shrinkage ratio of the print medium W differs by the type of the print medium W. The type of the print medium W is distinguished by whether or not the print medium W is a woven material, the type of the texture of the print medium W, the type or the material of a fiber constituting the print medium W, the type of the processing performed on the print medium W before printing, and so on. The processing position data 124 includes information related to the characteristics such as the shrinkage ratio in association with the type of the print medium W. It should be noted that the medium data 125 can also include a size change ratio instead of the shrinkage ratio, and in this case, the size change ratio representing the shrinkage takes a negative value.

The job data 126 is data of a print job to be executed by the printer 1. The print controller 112 controls the print head 9, the conveying mechanism 21, and the carriage drive mechanism 22 to perform printing on the print medium W in accordance with the job data 126.

FIG. 4 shows a configuration example of the job data 126.

The job data 126 illustrated in FIG. 4 includes basic job image designation information 151, a basic job printing condition 152, and a printing length 153. Further, first combining job image designation information 154, a first combining job arrangement condition 155, and a first combining job printing condition 156 are included. Further, processing pattern designation information 157, a processing pattern arrangement condition 158, and medium designation information 159 are included.

The printer 1 is capable of printing a plurality of images on the print medium W in a superimposed manner in a single print job. In the following description, an operation of the printer 1 printing one image on the print medium W is called a job. The operation of printing a plurality of images in a superimposed manner corresponds to an operation of performing a plurality of jobs in a combined manner. The printer 1 is capable of performing a first job, a second job, a third job, . . . , in a combined manner. In the present embodiment, a job for printing an image as a base on the print medium W is called a basic job. Further, a job for printing an image so as to be superimposed on the image printed in the basic job is called a combining job. The number of the combining jobs is not limited, and in the first embodiment, there is described an example of performing a single combining job. This combining job is referred to as a first combining job. Further, in a second embodiment described later, there is described an example of performing a second combining job together with the first combining job.

The basic job image designation information 151, the basic job printing condition 152, and the printing length 153 are the information related to the basic job. The basic job image designation information 151 is information for designating an image to be printed on the print medium W by the printing mechanism 20 in the basic job. The image designation information designates, for example, any of the images included in the image data 123.

The basic job printing condition 152 includes an operation condition of the print head 9 in the basic job, and is specifically printing resolution, printing density, information for designating an amount of the ink per unit area, and so on.

The printing length 153 is information for designating the length of an area where the image is printed in the basic job, and specifically determines the length in the conveying direction F of the print medium W by, for example, meters.

When the printing length is longer than the size of the image designated by the basic job image designation information 151, the print controller 112 repeatedly prints the image on the print medium W. Therefore, the image to be printed in the basic job can also be an image smaller in length than the printing length 153. Further, it is also possible for the print controller 112 to repeatedly print the image in a direction perpendicular to the conveying direction F, and in this case, the image to be printed in the basic job can also be an image smaller in width than the print medium W.

The first combining job image designation information 154 is information for designating the image to be printed in the first combining job. The specific configuration of the first combining job image designation information 154 is substantially the same as that of the basic job image designation information 151.

The first combining job arrangement condition 155 is information for designating the position where the image to be printed in the first combining job is arranged in the print medium W, and can also be data for defining a positional relationship between the image to be printed in the basic job and the image to be printed in the first combining job.

For example, when the print controller 112 prints the pattern of the texture in the entire area of the print medium W in the basic job and then prints the image in the first combining job so as to be superimposed on the pattern of the texture, it is conceivable to arrange the image in the first combining job in a dispersed manner. In this case, the print controller 112 repeatedly prints the image designated by the first combining job image designation information 154 at intervals set in advance. Further, as another example, it is also conceivable to repeatedly print the image designated by the first combining job image designation information 154 without interval in the first combining job.

As described above, the printer 1 has the configuration capable of designating the printing position of the image in the first combining job, and therefore designates the printing position of the image in the first combining job in accordance with the first combining job arrangement condition 155 included in the job data 126.

The first combining job printing condition 156 is information for designating a printing condition when printing the image in the first combining job. The specific content of the printing condition is substantially the same as, for example, that of the basic job printing condition 152.

The processing pattern designation information 157 is information for designating a type of the processing performed on the print medium W and a shape of the processing. The processing pattern designation information 157 can also be information for designating any of the types of processing included in the processing position data 124.

For example, when the processing position data 124 includes data for cutting the print medium W in three patterns related to the cutting processing, information for designating any one of the cutting patterns can be used as the processing pattern designation information 157.

The processing pattern arrangement condition 158 includes information for designating a position and a size of the pattern of the processing designated by the processing pattern designation information 157 when arranging the processing pattern in the print medium W. The processing pattern designation information 157 designates a configuration of the processing performed at one place of the print medium W. The processing pattern arrangement condition 158 is information for determining positions where a unit of processing, which is defined as processing designated by the processing pattern designation information 157 is performed, in the entire area of the print medium W. The processing pattern arrangement condition 158 can also be information for individually designating the positions where the processing is performed in the printer 1. Further, when the processing is performed at intervals on the print medium W, the processing pattern arrangement condition 158 can also be information for designating the intervals of the processing positions.

The processing pattern arrangement condition 158 is referred to in a process in which the display controller 113 generates and then displays a preview image 310. Further, the print controller 112 refers to the processing pattern arrangement condition 158 when printing the processing position images 220 representing the processing pattern on the print medium W.

The image in the basic job designated by the basic job image designation information 151 and the image in the first combining job designated by the first combining job image designation information 154 are printed with no exception. In the present embodiment, as illustrated in FIG. 2, the background image 211 is printed as the image in the basic job, and the logo images 212 are printed as the image in the first combining job. Further, the processing position represented by the processing pattern designation information 157 and the processing pattern arrangement condition 158 can be printed by the printer 1 as the processing position images 220.

The medium designation information 159 is information for designating a type of the print medium W to be the target of the printing based on the job data 126. The medium designation information 159 can be information for designating any of the types of the medium included in the medium data 125, and in this case, the control section 100 can obtain the shrinkage ratio of the print medium W included in the medium data 125 based on the medium designation information 159.

When the print medium W to be used is unknown, or when the type of the print medium W will not particularly be designated, the medium designation information 159 can be blank.

The print controller 112 performs the basic job and the first combining job based on the job data 126 to print the two images on the print medium W using the print head 9. It is also possible for the print controller 112 to print the image in the basic job and the image in the first combining job in the same pass. In other words, it is also possible to make the print head 9 discharge the ink IK so as to form the plurality of images while moving the print head 9 once in the main scanning direction SC. Further, it is also possible for the print controller 112 to print the plurality of images in respective passes different from each other. Specifically, it is also possible for the print controller 112 to perform the control for moving the print head 9 in the main scanning direction SC for each of the images to be printed.

The display controller 113 controls the display 33 to make the display 33 display a variety of screens. When the print controller 112 performs the operation based on the job data 126, the display controller 113 displays a preview screen 300 showing the images to be printed in accordance with the job data 126.

Figure 5:
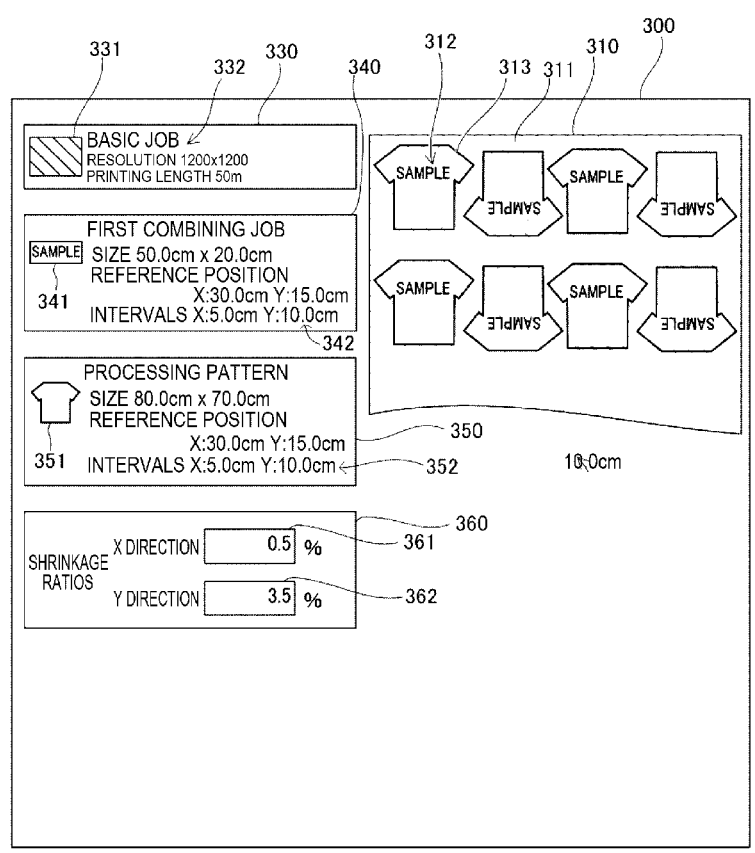
FIG. 5 is a diagram showing an example of a preview screen.

FIG. 5 is a diagram showing an example of the preview screen 300.

The preview screen 300 includes the preview image 310, a first information display 330, a second information display 340, a processing information display 350, and a shrinkage ratio designation section 360.

The preview image 310 is an image for showing the image to be printed on the print medium W while being contracted or simplified, and is displayed in a part of a display area of the preview screen 300. The preview screen 300 includes a background image 311 as the pattern of the texture to be printed on the print medium W, and combining images 312 to be printed so as to be superimposed on the background image 311.

The background image 311 is a preview of the background image 211 to be printed in the basic job. The combining images 312 are previews of the logo images 212 to be printed in the first combining job. As shown in FIG. 5, the combining images 312 are arranged in the background image 311 at predetermined intervals on the print medium W in a dispersed manner. The background image 311 corresponds to a first image, and the combining images 312 each correspond to a second image.

In the preview screen 300, there are displayed processing pattern images 313. The processing pattern images 313 are each a preview of the processing position image 220, and each display the position and the shape of the processing to be performed on the print medium W after printing on the display 33 as a preview. The processing pattern images 313 are each used as an index of the cutting position.

For example, when printing the background image 311 and the combining images 312 on the print medium W for manufacturing T-shirts, due to the preview screen 300 including the processing pattern images 313, it is possible for the operator to visually confirm the number of the T-shirts which can be manufactured from the print medium W. Further, based on the positional relationship between the combining images 312 and the processing pattern images 313, it is possible for the operator to visually check whether or not the combining image 312 is to be printed at a desired position in the T-shirt. Therefore, it is possible to adjust the printing positions of the combining images 312 taking the positions of the cutting processing into consideration. Further, by changing the positions of the processing pattern images 313, it is possible to search for appropriate processing positions. Further, at the positions of the processing pattern images 313, there are printed the processing position images 220 as described later. Therefore, when processing the print medium W after printing, it is possible to perform the processing using the processing position images 220 as an index.

The first information display 330 and the second information display 340 are areas for displaying the images to be printed and the printing conditions.

The first information display 330 includes a thumbnail image 331 and printing information 332. The thumbnail image 331 is a thumbnail image of the image to be printed in the basic job. The printing information 332 displays the information such as the printing condition and the printing length in the basic job with characters.

The second information display 340 includes a thumbnail image 341 and printing information 342. The thumbnail image 341 is a thumbnail image of the image to be printed in the first combining job. The printing information 342 displays the positions where the image in the first combining job is printed, and the printing condition of the image in the first combining job with characters. The printing positions of the images in the first combining job are expressed by a reference position on the print medium W and intervals at which the images are arranged. The reference position is displayed as the X coordinate and the Y coordinate shown in FIG. 2.

The processing information display 350 displays information related to the position and the shape of the processing performed on the print medium W. The processing information display 350 includes a processing icon 351 and processing information 352. The processing icon 351 is an icon obtained by simplifying the shape of the processing. The processing information 352 displays the processing positions with characters. The processing positions are expressed by a reference position on the print medium W and intervals between the positions at which the processing is performed. The reference position is displayed as the X coordinate and the Y coordinate shown in FIG. 2.

The shrinkage ratio designation section 360 includes input boxes 361, 362 for the operator to input the shrinkage ratios. The input boxes 361, 362 are a user interface for inputting the shrinkage ratios of the print medium W in the X direction and the Y direction, respectively. When an operation of selecting the input boxes 361, 362, and an operation of inputting a numerical value are performed using the keyboard 31 or the touch panel 32, the control section 100 obtains the numerical value thus input.

By the display controller 113 displaying the preview screen 300, it is possible to present the operator with the relative positional relationship between the images to be printed by the printer 1 and the processing positions before printing in an easy-to-understand manner.

1-4. Operation of Printer

Then, an operation of the printer 1 will be described. The operation described hereinafter is an operation example when the printer 1 prints the images on the print medium W based on the job data 126.

Figure 6:
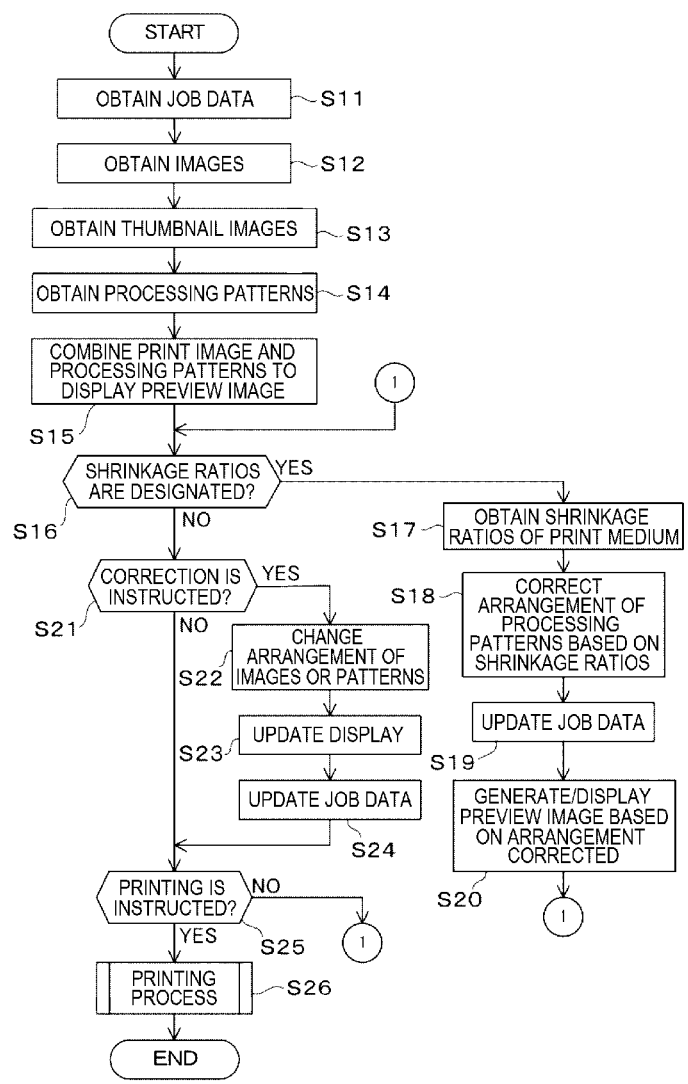
FIG. 6 is a flowchart showing an operation of the printer.

FIG. 6 is a flowchart showing the operation of the printer 1. The operation shown in FIG. 6 is started when the job data 126 to be executed is designated, and the execution of the job data 126 is instructed to the printer 1.

The print controller 112 obtains (step S11) the job data 126 to be executed from the storage section 120, and obtains (step S12) the images designated by the job data 126 from the image data 123. For example, in the example shown in FIG. 4, the images designated by the basic job image designation information 151 and the first combining job image designation information 154 are obtained in the step S12.

The display controller 113 obtains (step S13) the thumbnail images of the images obtained in the step S12. When the image data 123 includes the data of the thumbnail images in association with the data of the images to be printed, the display controller 113 obtains the thumbnail images from the image data 123. Further, when the thumbnail images are not stored in the storage section 120, the display controller 113 generates the thumbnail images based on the image data 123 in the step S13.

The display controller 113 obtains (step S14) the information related to the processing pattern which is designated by the processing pattern designation information 157 of the job data 126, from the processing position data 124.

The display controller 113 combines the thumbnail images obtained in the step S13 and the processing patterns obtained from the information obtained in the step S14 with each other to thereby generate the preview image 310, and then displays (step S15) the preview screen 300.

Here, the display controller 113 determines (step S16) whether or not the shrinkage ratios of the print medium W have been designated. When the type of the print medium W is designated by the medium designation information 159 of the job data 126, and the shrinkage ratios corresponding to the type of the print medium W thus designated are included in the medium data 125, the display controller 113 makes an affirmative determination in the step S16. Further, when the input detection section 111 has detected the operation of inputting the shrinkage ratios using the shrinkage ratio designation section 360 due to the operation of the keyboard 31 or the touch panel 32, the display controller 113 makes an affirmative determination in the step S16.

When the shrinkage ratios of the print medium W have been designated (YES in the step S16), the display controller 113 obtains (step S17) the shrinkage ratios of the print medium W based on the medium data 125 or the input values of the shrinkage ratio designation section 360. The display controller 113 corrects (step S18) the arrangement of the processing pattern images 313 to be displayed in the preview image 310 based on the shrinkage ratios. The process in the step S18 corresponds to a correction process.

Specifically, the display controller 113 determines the arrangement of the processing patterns in the print medium W based on the shape, the size, the reference position, the intervals, and so on of the processing patterns in the step S15, and then generates and displays the preview image 310. The display controller 113 corrects the size and the intervals of the processing patterns in the step S18. For example, when the shrinkage ratio in the Y direction of the print medium W is 3.5%, the print medium W is cut in the cutting processing of the print medium W so that the size in the standard is achieved after the shrinkage of 3.5% has occurred. For example, the cutting is performed after increasing the cutting size with no consideration of the shrinkage ratio by 3.62%, namely enlarging the cutting size to 1.0362 times as large as the cutting size with no consideration of the shrinkage ratio. In the step S18, the display controller 113 corrects the sizes of the processing pattern images 313 and the intervals between the processing pattern images 313 so as to compensate the shrinkage based on the shrinkage ratios of the print medium W similarly to the cutting processing.

The display controller 113 updates (step S19) the job data 126 based on the sizes and the intervals of the processing pattern images 313 having been corrected. Thus, the processing pattern arrangement condition 158 included in the job data 126 is corrected in accordance with the shrinkage ratios obtained in the step S17. It is also possible for the display controller 113 to add data based on the sizes and the intervals of the processing pattern images 313 having been corrected, to the processing pattern arrangement condition 158 in the step S19. In this case, since the processing pattern arrangement condition 158 not corrected in accordance with the shrinkage ratios is maintained, it is possible to easily deal with, for example, when the shrinkage ratios are changed.

The display controller 113 generates the preview image 310 once again based on the sizes and the intervals of the processing pattern images 313 having been corrected, and then displays (step S20) the preview image 310 in the preview screen 300, and then makes the transition to the step S21. Further, when the designation of the shrinkage ratios of the print medium W is not made (NO in the step S16), the control section 100 makes the transition to the step S21.

In the step S21, the print controller 112 determines (step S21) whether or not an input for instructing the correction of the positions of the combining images 312 or the positions of the processing pattern images 313 has been performed. When the print controller 112 has determined that the correction of the positions has been instructed by the operation of the keyboard 31 or the touch panel 32 (YES in the step S21), the print controller 112 changes (step S22) the positions of the combining image 312 or the processing pattern images 313 in accordance with the instruction.

The display controller 113 updates (step S23) the display of the preview image 310 based on the positions of the combining images 312 and the processing pattern images 313 having been changed in the step S22. Further, the print controller 112 updates (step S24) the job data 126 based on the positions of the combining images 312 and the processing pattern images 313 having been changed in the step S22, and then makes the transition to the step S25. Further, when the correction of the positions of the combining images 312 or the positions of the processing pattern images 313 is not instructed (NO in the step S21), the control section 100 makes the transition to the step S25.

In the step S25, the print controller 112 determines (step S25) whether or not the print execution has been instructed by the operation of the keyboard 31 or the touch panel 32. When the print execution has not been instructed (NO in the step S25), the control section 100 returns the process to the step S21.

When the print execution has been instructed (YES in the step S25), the print controller 112 executes (step S26) the printing process on the print medium W in accordance with the job data 126.

Figure 7:
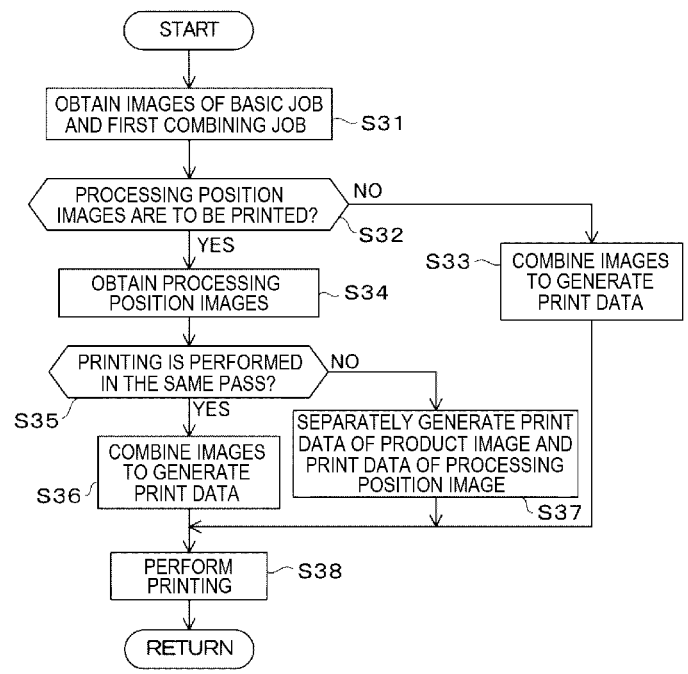
FIG. 7 is a flowchart showing an operation of the printer.

FIG. 7 is a flowchart showing an operation of the printer 1, and shows the printing process in the step S26 in detail.

The print controller 112 obtains (step S31) the image in the basic job and the image in the first combining job based on the job data 126.

The print controller 112 determines (step S32) whether or not the processing position images 220 are to be printed. It is possible for the print controller 112 to selectively perform an operation of printing the product image 210 in the basic job and the first combining job set as the job for printing in the job data 126, and an operation of printing the processing position images 220 together with the product image 210 in a superimposed manner. Which one of the operations is performed by the print controller 112 is set in advance, and the setting content is included in the setting data 122.

When the processing position images 220 are not printed (NO in the step S32), the print controller 112 combines the images in the basic job and the first combining job with each other in substantially the same manner as the preview image 310 to generate (step S33) the print data. The print controller 112 controls the printing mechanism 20 to perform (step S34) the printing on the print medium W based on the print data thus generated, and then terminates the present process.

When printing the processing position images 220 (YES in the step S32), the print controller 112 obtains (step S35) the image for printing the processing position images 220 based on the job data 126. In the step S35, the print controller 112 obtains, for example, the image having obtained in the step S14. Further, it is also possible for the print controller 112 to generate the image of the processing position images 220 based on the job data 126 in the step S35.

The print controller 112 determines (step S36) whether or not the processing position images 220 and the product image 210 are to be printed in the same pass. When printing the both in the same pass (YES in the step S36), the print controller 112 combines the background image 211, the logo images 212, and the processing position images 220 with each other to generate (step S37) the data for printing, and then makes the transition to the step S34 to perform printing.

When performing the processing position images 220 and the product image 210 in the respective passes different from each other (NO in the step S36), the print controller 112 generates (step S38) the data for printing obtained by combining the background image 211 and the logo images 212 with each other, and the data for printing of the processing position images 220 separately from each other. Subsequently, the print controller 112 makes the transition to the step S34 to perform printing.

As described hereinabove, the printer 1 according to the present embodiment is provided with the printing mechanism 20, the display 33, and the print controller 112 for controlling the printing mechanism 20 to print the images on the print medium W. The printer 1 is provided with the display controller 113 for making the display 33 display the preview image 310 obtained by superimposing the image to be printed on the print medium W and the processing positions where the processing is performed on the print medium W after the printing with each other. The print controller 112 makes the printing mechanism 20 print the image and the processing position images representing the processing positions.

According to the printing apparatus, the print control device, and the printer 1 to which the method of controlling the printing apparatus is applied, the preview image 310 is displayed on the display 33. It is possible to present the relative positional relationship between the position of the image to be printed on the print medium W and the position of the processing planed to be performed on the print medium W in an easy-to-understand manner before starting the printing using the preview image 310. Further, the processing position images 220 are printed together with the product image 210 on the print medium W in substantially the same manner as the preview image 310. Thus, it is possible for the operator operating the printer 1 to make the processing positions be printed after confirming the relationship between the images to be printed on the print medium W and the processing positions using the preview image 310.

The display controller 113 performs the correction process for correcting the processing positions based on the shrinkage ratios of the print medium W. The display controller 113 makes the display 33 display the preview image including the processing positions after the correction process has been performed. Therefore, it is possible to more accurately display the processing positions when the processing taking the shrinkage ratios of the print medium W into consideration is performed. Therefore, it is possible for the operator to correctly determine, for example, whether or not the printing positions of the combining images 312 and the processing positions represented by the processing pattern images 313 appropriately correspond to each other by looking at the preview image 310.

The display controller 113 functions as a data acquisition section for obtaining the data representing the processing positions and the shrinkage ratios of the print medium W. For example, the display controller 113 obtains the data in the step S14 and the step S17 as the data acquisition section. In the correction process in the step S18, the display controller 113 corrects the data of the processing positions obtained from the processing position data 124 based on the shrinkage ratios of the print medium W. Thus, it is possible to appropriately correct the processing positions of the processing to be performed on the print medium W based on the shrinkage ratios of the print medium W.

The printer 1 is provided with the keyboard 31 and the touch panel 32 as the input device for receiving the input. The display controller 113 obtains the shrinkage ratios of the print medium W input by the input device. For example, the display controller 113 obtains the input values in the input boxes 361, 362 disposed in the shrinkage ratio designation section 360. Thus, it is possible to execute the correction process based on the shrinkage ratios input by the operator.

It is possible for the print controller 112 to selectively perform the operation of printing the image by the printing mechanism 20, and the operation of printing the image and the processing position image by the printing mechanism 20. In other words, the printer 1 selects either one of the operation of printing the processing position images 220 together with the product image 210 and the operation of skipping printing of the processing position images 220, and then executes the operation thus selected. Therefore, it is possible to print the processing positions, or only to display the processing positions at the request of the operator operating the printer 1.

Further, it is possible for the print controller 112 to selectively perform same scan printing for printing the product image 210 and the processing position images 220 in the same pass of the print head 9, and separate scan printing for printing the product image 210 and the processing position images 220 in the different passes. When selecting the same scan printing, the printing proceeds at higher speed, and therefore, an improvement in printing throughput can be expected. Further, when selecting the separate scan printing, it is possible to reduce the risk that the ink IK discharged from the print head 9 bleeds on the print medium W. It is possible for the operator to select the separate scan printing when, for example, bleeding is apt to occur depending on the type of the ink IK used for the printing of the product image 210 and the processing position images 220. As described above, it is possible for the operator to appropriately set the printing condition taking the printing throughput on the print medium W and the printing quality into consideration.

The print controller 112 makes the printing mechanism 20 print the first image, and the second image to be arranged within the range in which the first image is to be printed. The first image is, for example, the background image 211, and the second image is the logo image 212 to be printed in the first combining job. The printer 1 is capable of combining these images with each other to thereby print the product image 210. Therefore, it is possible to realize work saving compared to when, for example, cutting out a strip of cloth from the print medium W, and then printing the second image on the strip of cloth. In this case, since it is possible for the operator to check the relative position of the printing position of the second image and the processing position using the preview image 310, it is possible to prevent the position gap to print the second image at an appropriate position.

The print controller 112 changes the relative printing position of the second image to the first image, and makes the printing mechanism 20 print the first image and the second image in accordance with the printing position having been changed. Thus, it is possible for the operator to adjust the printing position of the second image with reference to the preview image 310.

The printer 1 is provided with the keyboard 31 and the touch panel 32 as the input device for receiving the input. In the state in which the preview image 310 including the first image, the second image, and the processing position is displayed, the print controller 112 changes the printing position of the second image based on the input received by the input device. The display controller 113 updates the display of the preview image in accordance with the position of the second image having been changed. Thus, it is possible for the operator to adjust the printing position of the second image with reference to the preview image 310, and confirm the printing position of the second image having been adjusted using the preview image 310. Therefore, it is possible to print the second image at an appropriate position in accordance with the position of the processing after the printing.

2. Second Embodiment

Subsequently, the second embodiment to which the present disclosure is applied will be described.

A configuration of the printer 1 in the second embodiment is the same as the configuration described above in the first embodiment, and the content of the job data 126 and the image to be printed by the control of the print controller 112 are different from those of the printer 1 in the first embodiment. In the second embodiment, the constituents common to the first embodiment are denoted by the same reference symbols, and the description thereof will be omitted. Further, in the explanation of the flowchart described later, the same operations as in the first embodiment are denoted by the same step numbers, and the description thereof will be omitted.

Figure 8:
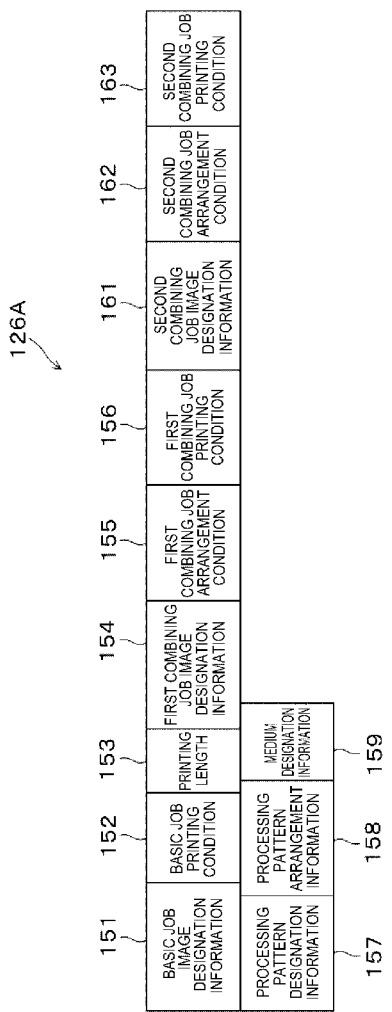
FIG. 8 is a schematic diagram showing a configuration example of job data in a second embodiment.

FIG. 8 is a diagram showing a configuration example of the job data 126A.

The job data 126A is data for instructing execution of a second combining job in addition to the basic job and the first combining job. The job data 126A has a configuration obtained by adding second combining job image designation information 161, a second combining job arrangement condition 162, and a second combining job printing condition 163 to the configuration of the job data 126 shown in FIG. 4.

The second combining job image designation information 161 is information for designating an image to be printed in the second combining job, and the specific configuration is substantially the same as, for example, the first combining job image designation information 154.

The second combining job arrangement condition 162 is information for designating a position where the image to be printed in the second combining job is arranged in the print medium W. The second combining job arrangement condition 162 can also be data for defining a positional relationship between the image to be printed in the basic job and the image to be printed in the second combining job similarly to the first combining job arrangement condition 155.

The second combining job printing condition 163 is information for designating a printing condition when printing the image in the second combining job. The specific content of the printing condition is substantially the same as, for example, that of the first combining job printing condition 156.

Figure 9:
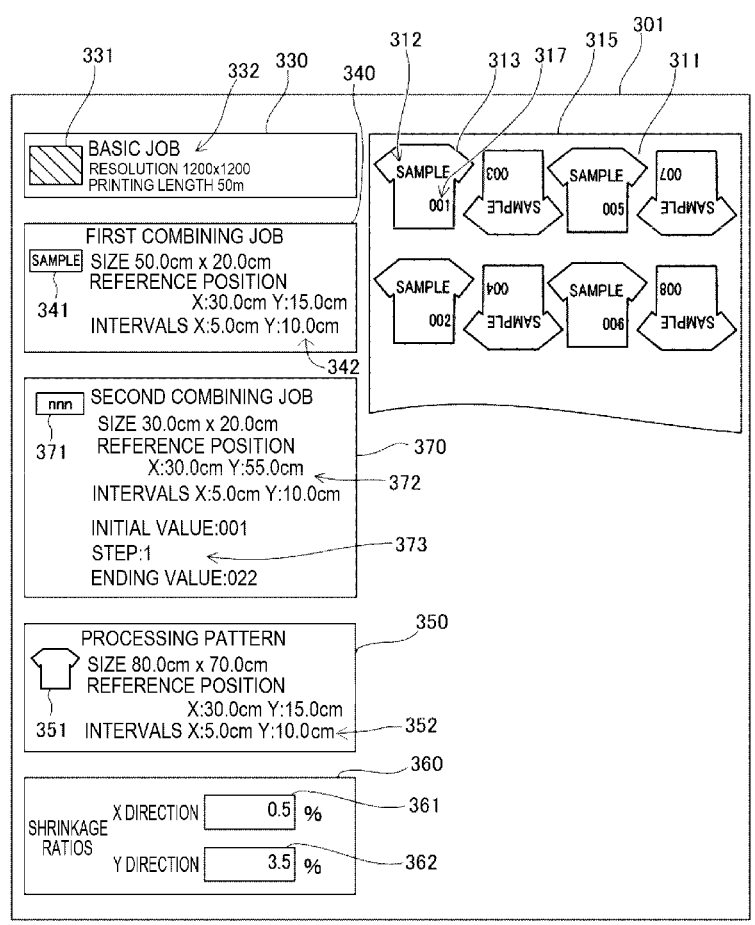
FIG. 9 is a diagram showing an example of a preview screen in the second embodiment.

FIG. 9 is a diagram showing an example of a preview screen 301 to be displayed by the display controller 113 in the second embodiment.

The preview screen 301 is configured similarly to the preview screen 300. The preview screen 301 is different from the preview screen 300 in the point that a preview image 315 is disposed instead of the preview image 310 shown in FIG. 5, and a third information display 370 is disposed.

The preview image 315 includes variable print images 317 in addition to the background image 311 and the combining images 312. The variable print images 317 each represent an image to be printed in the second combining job.

Further, the third information display 370 is an area for displaying information related to the image to be printed in the second combining job, and includes a sample image 371, printing information 372, and a change condition 373.

The second combining job to be performed by the printer 1 in the second embodiment is a job for printing variable images. The variable images each mean an image the content of which is changed when printed. For example, the contents of the plurality of images arranged in the print medium W are changed every time the images are arranged or changed with a predetermined period.

In the example described in the second embodiment, the variable images are each a three-digit numerical value to be printed in the second combining job. The numerical value in each of the digits is incremented in accordance with a predetermined rule, and the variable print images 317 constituted by respective numbers different from each other are arranged in the print medium W so as to be superimposed on the image of the background image 311. In the preview image 315 shown in FIG. 9, the plurality of variable print images 317 is arranged, and the contents of the respective variable print images 317 are set to 001, 002, 003, . . . , 008 as numerical values.

It is possible to adopt a configuration in which the rule related to the change of the numerical values as the contents of the variable images is included in the second combining job image designation information 161, or such a rule can be included in the second combining job arrangement condition 162.

In the third information display 370, the rule related to the change of the variable image is displayed as the change condition 373. Specifically, an initial value is "001," an incremental step is "1," and an ending value is "022." The print controller 112 increments the numerical value of the variable image from "001" by "1," and then sets to "001" once again when reaching "022."

The sample image 371 disposed in the third information display 370 is an image in which the fact that the variable image is a three-digit numerical value is represented by a variable, and shows the fact that the variable image constituted by the three-digit numerical value is to be printed in the second combining job. Since the variable image varies with the printing, the sample image 371 functioning as a sample image is disposed instead of the thumbnail image.

In this example, the plurality of numerical values incremented by "1" is printed on the print medium W. Therefore, the plurality of variable print images 317 different in content is also arranged in the preview image 315.

Figure 10:
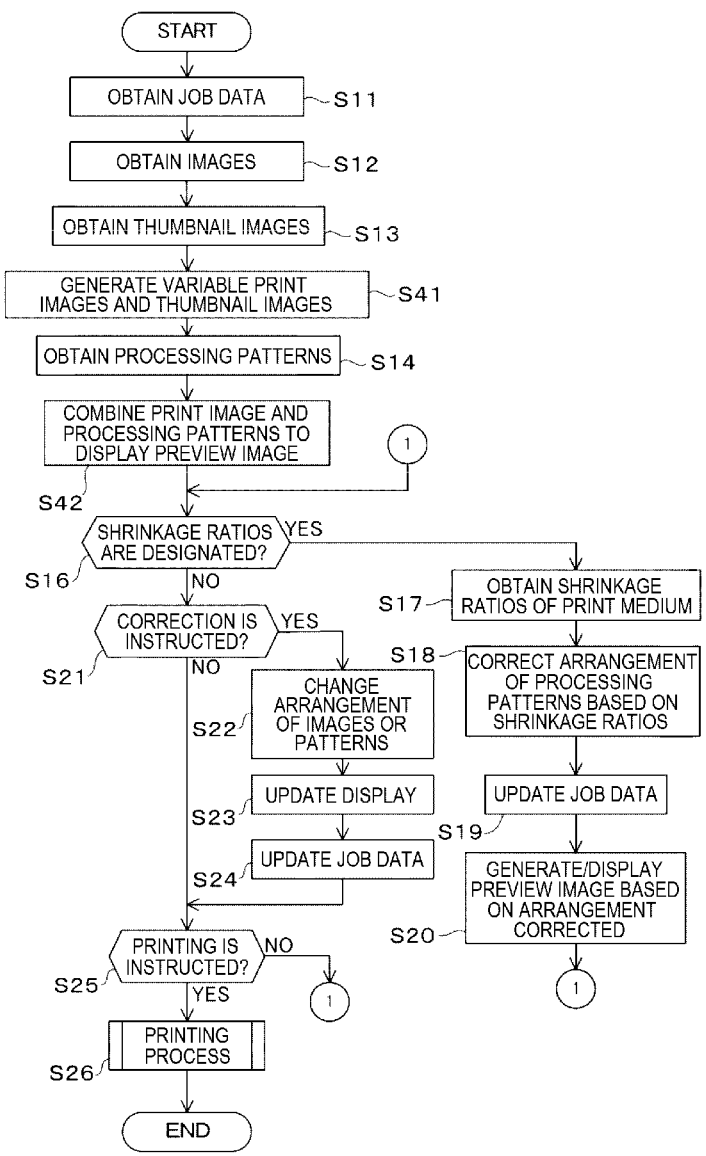
FIG. 10 is a flowchart showing an operation of a printer according to the second embodiment.

FIG. 10 is a flowchart showing an operation of the printer 1 in the second embodiment.

The print controller 112 generates the variable images to be printed in the second combining job after the process in the step S13, and then generates (step S41) the thumbnail images of the respective variable images thus generated. In the step S41, the print controller 112 generates the variable images to be printed on the print medium W in accordance with the rule of the variable image included in the job data 126A. In the example shown in FIG. 9, the print controller 112 generates the images of "001" through "022." Further, the print controller 112 generates thumbnail images of the images thus generated. These thumbnail images are displayed as the variable print images 317 in the preview image 315.

Then, the display controller 113 generates the preview image 315, and then displays (step S42) the preview screen 301. In the step S42, the display controller 113 arranges the thumbnail images of the images to be printed in the basic job and the first combining job obtained in the step S13, and the thumbnail images of the variable images generated in the step S41 in the preview image 315. Further, the display controller 113 combines the processing pattern images 313 which can be obtained from the information obtained in the step S14 with the preview image 315. Due to this process, it is possible to display the preview image 315 showing the relative positional relationship between the background image 311, the combining images 312, and the variable print images 317, and the processing pattern images 313.

In which the preview screen 301 is displayed, by the operation of the keyboard 31 or the touch panel 32 in the state, it is possible to correct the positions of the variable print images 317. On this occasion, the print controller 112 changes the positions of the variable print images 317 in the step S22 in accordance with the instruction of changing the positions of the variable print images 317, and then updates the preview image 315 and the job data 126A.

As described above, according to the printer 1, when sequentially generating the variable images different from each other to print the variable images on a single print medium W, it is possible to present the relative positional relationship between the printing positions of the variable images and the processing positions using the preview screen 301. In other words, the print controller 112 arranges the plurality of second images in the area where the single first image is printed by the printing mechanism 20, and at least any of the second images is different from the other of the second images. Here, the second images correspond to the variable print images 317. Therefore, also when printing the variable images, it is possible for the operator to visually confirm with ease whether or not the positions of the images to be printed on the print medium W correspond to the processing positions. Further, it is possible to make the print controller 112 print the images in the basic job, the first combining job, and the second combining job in the printing process in the step S26. In other words, the print controller 112 prints the variable images corresponding to the variable print images 317 on the print medium W as a part of the product image 210 together with the background image 211 and the logo images 212.

Further, due to the setting data included in the setting data 122, it is possible to print the processing position images 220 on the print medium W.

It should be noted that the embodiments described above each show a specific example to which the present disclosure is applied, and the present disclosure is not limited to the embodiments.

For example, although in the embodiments described above, the description is presented citing the printer 1 for conveying the print medium W wound to form a rolled shape to print an image thereon as an example, the present disclosure is not limited to this example. For example, it is possible to apply the present disclosure to a printer for fixedly holding the print medium such as the fabric as a print target, and relatively moving the print head 9 with respect to the print medium to thereby perform printing. For example, it is also possible to apply the present disclosure to a so-called garment printer for fixing clothing or sewing cloth as the print medium, and discharging ink to the print medium to thereby perform printing. Further, it is also possible to apply the present disclosure to a printing apparatus for performing printing not only on the fabric, but also on a knitted material, paper, a sheet made of synthetic resin, and so on.

Further, the application target of the present disclosure is not limited to a device used alone as the printing apparatus, but it is also possible to apply the present disclosure to a device having a function other than the printing function such as a multifunctional machine having a copying function or a scanning function, or a POS terminal device.

Further, the printer 1 can also be a device using the ink IK curing by ultraviolet irradiation, and in this case, it is also possible to provide the printer 1 with an ultraviolet irradiation device instead of the drying section 7. Further, it is also possible for the printer 1 to have a configuration provided with a washing device for washing the print medium W having been dried by the drying section 7, and other detailed configurations of the printer 1 can arbitrarily be changed.

Further, the functional sections of the control section 100 can be constituted as a program to be executed by the processor 110 as described above, and in addition, it is also possible to realize the functional sections of the control section 100 by a hardware circuit incorporating the program. Further, it is also possible to adopt a configuration in which the printer 1 receives the program described above from a server device or the like via a transmission medium.

What is claimed is:

1. A printing apparatus comprising:
a printing mechanism that includes a print head with which a print medium is scanned;
a display;
a print controller configured to control the printing mechanism to print an image on a print medium; and
a display controller configured to cause the display to display a preview image,
wherein the preview image is the image to be printed on the print medium and a processing position image and the image and the processing position image are superimposed on each other,
wherein the processing position image indicates a processing position where processing is to be performed on the print medium after printing, and the processing includes at least one of cutting, buttonhole formation, embossing, sewing, stitching or bonding of another member, folding process for providing a crease, or painting,
wherein the print controller selectively causes the printing mechanism to print the image and the processing position image in a same scan printing wherein the printing mechanism will print the image and the processing position image in a same pass of the print head, or a separate scan printing wherein the printing mechanism will print the image and the processing position image in a different pass of the print head, and
wherein the print controller makes the printing mechanism print a first image, and a second image disposed within a range in which the first image is printed.

2. The printing apparatus according to claim 1, wherein the display controller performs a correction process configured to correct the processing position based on a shrinkage ratio of the print medium, and makes the display display the preview image including the processing position on which the correction process was performed.

3. The printing apparatus according to claim 2, further comprising:
a data acquisition section of the display controller configured to obtain data representing the processing position and the shrinkage ratio of the print medium, wherein
the display controller corrects the data obtained by the data acquisition section based on the shrinkage ratio of the print medium obtained by the data acquisition section in the correction process.

4. The printing apparatus according to claim 3, further comprising:
an input device configured to receive an input, wherein the data acquisition section obtains the shrinkage ratio of the print medium input by the input device.

5. The printing apparatus according to claim 1, wherein the print controller selectively performs an operation of printing the image by the printing mechanism, and an operation of printing the image and the processing position image by the printing mechanism.

6. The printing apparatus according to claim 1, wherein the print controller changes a relative printing position of the second image to the first image, and makes the printing mechanism print the first image and the second image in accordance with the printing position changed.

7. The printing apparatus according to claim 1, further comprising:

an input device configured to receive an input, wherein
the print controller changes the printing position of the second image based on the input received by the input device in a state in which a preview image including the first image, the second image, and the processing position is displayed, and
the display controller updates display of the preview image in accordance with the position of the second image changed.

8. The printing apparatus according to claim 1, wherein the print controller arranges a plurality of the second images in an area where the single first image is printed by the printing mechanism, and at least any of the second images is different from other of the second images.

9. A print control device comprising:
a print controller configured to control a printing mechanism to print an image on a print medium, wherein the printing mechanism includes a print head with which the print medium is scanned; and
a display controller configured to cause a display to display a preview image,
wherein the preview image is a state of the image printed on the print medium and a processing position image and the image and the processing position image are superimposed with each other,
wherein the processing position image represents a processing position where processing is to be performed on the print medium after printing, and the processing includes at least one of cutting, buttonhole formation, embossing, sewing, stitching or bonding of another member, folding process for providing a crease, or painting,
wherein the print controller selectively causes the printing mechanism to print the image and the processing position image in a same scan printing wherein the printing mechanism will print the image and the processing position image in a same pass of the print head, or a separate scan printing wherein the printing mechanism will print the image and the processing position image in a different pass of the print head, and
wherein the print controller makes the printing mechanism print a first image, and a second image disposed within a range in which the first image is printed.

10. A method of printing on and processing a print medium by controlling a printing apparatus comprising a printing mechanism configured to print an image on the print medium, and a display, the method comprising:
displaying, on the display, a preview image in which the image to be printed on the print medium and a processing position image are superimposed with each other, the processing position image representing a processing position where processing is to be performed on the print medium after printing;
printing, by the printing mechanism, the image and the processing position image; and
performing the processing on the medium which corresponds to the processing position image printed on the medium and the processing includes at least one of cutting, buttonhole formation, embossing, sewing, stitching or bonding of another member, folding process for providing a crease, or painting,
wherein the print controller makes the printing mechanism print a first image, and a second image disposed within a range in which the first image is printed.

* * * * *